Nov. 16, 1948.　　　G. L. FREDENDALL　　　2,454,150
VOLTAGE ADJUSTING SYSTEM
Filed March 13, 1944
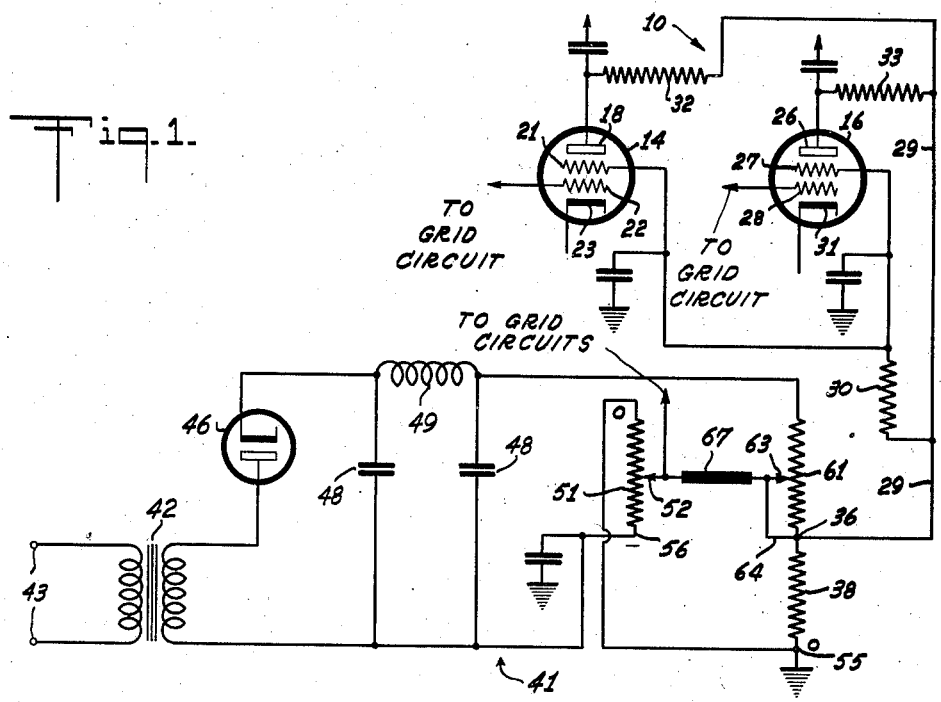
INVENTOR.
GORDON L. FREDENDALL
BY
ATTORNEY.

Patented Nov. 16, 1948

2,454,150

UNITED STATES PATENT OFFICE 2,454,150

VOLTAGE ADJUSTING SYSTEM

Gordon L. Fredendall, Feasterville, Pa., assignor to Radio Corporation of America, a corporation of Delaware Application March 13, 1944, Serial No. 526,287

4 Claims. (Cl. 250—27)

The present invention relates to an arrangement for maintaining constant voltage on the high voltage electrodes of one or more vacuum tubes, and more particularly to a system in which a change in voltage conditions in the input circuit of a vacuum tube or tubes is accompanied by a compensating change in the voltage conditions in the high voltage electrode circuits, such as the anode and/or screen electrode circuits.

In electronic equipment employing vacuum tubes, and more particularly in television receivers, it is desirable that the supply voltage for the high voltage electrodes, such as the plates and screens, does not change appreciably as the current requirements of the tubes are changed when the input control, usually known as the volume or gain control, is varied. Ordinarily, changes in the plate supply voltage do occur if the power supply terminal voltage is not maintained by some form of voltage regulator. In such cases, the present invention has for its aim to maintain substantially constant plate supply voltage, not by employing costly regulating tubes, glow tubes, etc., but by providing cooperative means for varying the resistance of the plate and screen load circuit concomitantly with the operation of the gain control, the two operations being performed in such a manner that the effect of one offsets the effect of the other.

The principal object of the present invention is to provide simple, effective, and low cost means for maintaining a substantially constant voltage on the high voltage electrodes of a vacuum tube or tubes irrespective of the selective degree of gain in signal output from the equipment.

A further object of the present invention is to provide means for obtaining substantially constant voltage at the high voltage electrodes of the vacuum tubes in electronic apparatus without the need for employing a voltage regulator or the like, or effecting substantial changes in the arrangement of the apparatus and the wiring thereof.

Still further objects of the invention will become apparent and suggest themselves to those skilled in the art to which the invention is directed upon reading the following specification and claims in connection with the drawings in which:

Fig. 1 is a diagrammatic showing of the electronic apparatus embodying the improvement of this invention; and Fig. 2 is a diagrammatic showing of an application of the invention in slightly modified form.

Referring to Fig. 1 of the drawings, electronic apparatus shown diagrammatically and indicated generally by reference character 10 may comprise, for example, vacuum tubes 14 and 16 associated together by any of the known circuit arrangements. Tube 14 includes within its envelope an anode electrode or plate 18 and a screen electrode or screen grid 21. These two electrodes may be regarded as the high voltage electrodes of the tube. The tube also comprises a control electrode or signal actuated grid 22 and a source of electrons, such as the separately heated cathode 23. In a like manner the tube 16 also has plate and screen electrodes 26 and 27 respectively, a signal grid 28, and a cathode 31. The screen grids 21 and 27 are connected to a lead 29 which supplies the high voltage electrodes of the electronic apparatus 10. The connection may, if required by circuit design considerations, include a voltage dropping resistor 30. The screen grids 22 and 28 may be connected to any of the signal input circuits usually found in electronic apparatus.

The plates 18 and 26 of the tubes are shown as being connected through load resistors 32 and 33 to the lead 29 which is in turn connected to the positive terminal 36 of a voltage divider 38 forming a part of the power supply unit indicated generally by reference character 41. The primary winding of the power transformer 42 is connected in the usual manner to alternating current service mains or the like 43. The secondary winding of this power transformer is connected in series with a rectifier 46 and the voltage divider 38. The rectifier 46 is shown as a half-wave rectifier for the sake of simplicity; however, it will be understood that a full wave rectifier may be utilized and that any known connection between the rectifier 46 and the voltage divider 38 may be employed.

A smoothing filter combination of parallel capacitances 48 and a series inductance 49 serve to provide a steady, ripple-free current through the voltage divider 38. While a capacity input type of filter is shown, it will be understood that any other appropriate type of filter network may be employed.

The tube biasing potentiometer resistor which may serve as a volume control for the apparatus 10 is indicated at 51. A sliding contact 52 is connected to the grid circuits of the grids 22 and 28 and the grids of other tubes if they are present in the apparatus 10. In the power supply unit 41, selected for purposes of illustration, grid bias is obtained in a well known manner by arranging the rectifier series circuit so that the cathode leads are connected to a point 55 on the voltage divider 38 which may be grounded as shown. The end 56 of the resistor 51 is therefore more negative than the point 55. It will be understood, of course, that other sources of negative bias may be used such as a separate rectifier or a separate battery; or the volume or gain control may be of an entirely different kind.

As the sliding contact 52 is moved toward the point 56 to reduce the volume, the anode and screen currents normally will be decreased so that if the power supply unit is not regulated, the cathode and screen voltage will rise, thereby upsetting the normal operation of the electronic apparatus 10. If the apparatus 10 serves as the synchronizing equipment for a television receiver, and more particularly where automatic frequency control is employed, this change in plate and screen voltage, if it is not prevented, necessitates very careful design in the synchronizing circuits and may require additional apparatus in these synchronizing circuits. In order to avoid the necessity for changes in the synchronizing circuits or undue complication in their design, without resorting to equally expensive and complicated voltage regulating arrangements for the power unit 41, and in accordance with this invention, a resistor 61 is introduced into the supply line from the power supply which, in the illustrative embodiment, is the rectifier tube 46. To provide for changing the value of the resistor 61 concurrently and in the right amount as the volume control 52 is moved, the sliding contact 63 engages the resistor 61 to short circuit a portion thereof by means of a conductor 64. The mechanical connection between the sliding contact 52 and the sliding contact 63 is represented as a piece of insulating material 67. It will be understood that the units 51 and 61 are preferably combined in a single structure with rotary contacts operated by a common shaft which may be represented diagrammatically by the insulating material 67.

The operation of the improved plate and screen supply system will be briefly reviewed. As the volume or gain control 52 is moved toward the more negative end to decrease the volume or gain, the voltage at point 36 will rise due to the decreased current requirements of the tubes supplied from the power supply unit 41. However, the rheostat 61 maintains a substantially constant potential at the point 36 by introducing more resistance into the supply line from the power supply, in this instance the rectifier tube 46.

Fig. 2 of the drawings shows a slightly modified arrangement in which the improvement of the present invention is incorporated in the electronic apparatus indicated generally by reference character 71. The apparatus 71 may include one or more vacuum tubes shown symbolically at 72. An anode 76 and a screen electrode 77 are intended to represent the total screen and plate connections of the apparatus 71, the respective load resistors being indicated at 79 and 81. These electrodes are connected to the terminal 82 of the apparatus marked in the customary manner with a plus sign. The tube 72 is shown as being provided with a signal grid 84 which is connected to the adjustable contact 87 of a volume or gain control potentiometer 88 through the usual leak resistor 89.

A power supply unit 90, which may be of the usual type, is provided with an additional terminal connection 91 so that a resistor 92 corresponding to the resistor 61 of Fig. 1, but located in the apparatus 71, may be inserted in series with the usual voltage divider resistor (not shown) and the positive side of the power supply source which, as shown in Fig. 1, may be a rectifier. The positive side of the voltage divider resistor is connected to a terminal 95. The usual neutral point terminal is indicated at 93, and the terminal 94 is connected internally to a point which is negative with respect to the terminal 93. This may be accomplished as pointed out previously by employing a separate source of negative biasing potential if desired.

The resistor 92 is provided with a sliding contact 96 which is mechanically connected by an insulating member 97 to the sliding contact 87 of the potentiometer 88. As before, the potentiometer 88 and the rheostat comprising the resistor 92 may be incorporated in a single rotary structure with the operating means exposed exteriorly of the enclosure for the apparatus 71.

The operation of the apparatus disclosed in Fig. 2, it is believed, will be obvious in view of the preceding description. It will be noted that the combination of the apparatus 71 and the power supply unit 90 is modified only to the slight extent necessary to embody the improvement of this invention in its most convenient form.

Various alterations and modifications may be made in the present invention without departing from the spirit and scope thereof, and it is desired that any and all such modifications be considered within the purview of the present invention as defined by the hereinafter appended claims.

Having now described the invention, what is claimed and desired to be secured by Letters Patent is the following:

1. In a system for providing desired operating voltages at the electrodes of vacuum tube equipment, a power supply source, adjustable means for providing an adjustable negative biasing potential for the control electrodes of said tubes, means including a voltage dividing resistor for providing operating potentials at the high voltage electrodes of said tubes from said power supply source, a variable resistor in series with said voltage divider and said power supply source, and common operating means for adjusting said bias and said adjustable resistor whereby to maintain the voltage at said high voltage electrodes substantially constant for various degrees of adjustment of said biasing voltage.

2. In a system for providing operating voltages to the electrodes of vacuum tube equipment, a power supply source, a voltage divider electrically in parallel with said source, a potentiometer for providing an adjustable negative biasing potential for the control electrodes of said tubes, a connection to said voltage divider for providing operating potentials at the high voltage electrodes of said tubes from said power supply source, a variable resistor connected between said voltage divider and the positive terminal of said power supply source, and common operating means for adjusting said potentiometer and said adjustable resistor whereby to maintain the voltage at said high voltage electrodes substantially constant for various degrees of adjustment of said biasing voltage.

3. In a system for providing operating voltages to the high voltage electrodes of vacuum tube equipment from a power supply source having a voltage divider electrically in parallel with said source, a potentiometer for providing an adjustable negative biasing potential for the control electrodes of the tubes, means forming a connection to said voltage divider for providing operating potentials at the high voltage electrodes of said tubes, a variable resistor, means connecting said variable resistor between said voltage divider and the positive terminal of said power supply source, and operating means for adjusting said potentiometer and said adjustable resistor together to thereby maintain the voltage of the said high voltage electrodes substantially constant for various degrees of adjustment of said biasing voltage.

4. The combination of claim 3 wherein said potentiometer and said variable resistor are each part of a unitary structure, and said operating means comprises a common operating member.

GORDON L. FREDENDALL.

REFERENCES CITED

The following references are of record in the file of this patent:

UNITED STATES PATENTS

| Number | Name | Date |
|---|---|---|
| 2,088,231 | Cohn | July 27, 1937 |
| 2,235,040 | Penner | Mar. 18, 1941 |
| 2,237,420 | Ferris | Apr. 8, 1941 |